(12) United States Patent
Lam et al.

(10) Patent No.: US 12,294,839 B2
(45) Date of Patent: May 6, 2025

(54) METHOD AND SYSTEM FOR REPETITIVE NOISE IDENTIFICATION

(71) Applicant: Hong Kong Applied Science and Technology Research Institute Company Limited, Hong Kong (HK)

(72) Inventors: Pui Ho Lam, Hong Kong (HK); Tze Yui Ho, Hong Kong (HK); Man Tik Li, Hong Kong (HK); Jingyi Xu, Hong Kong (HK); Wai Cheong Ku, Hong Kong (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 264 days.

(21) Appl. No.: 18/144,017

(22) Filed: May 5, 2023

(65) Prior Publication Data

US 2023/0362539 A1 Nov. 9, 2023

Related U.S. Application Data

(60) Provisional application No. 63/338,901, filed on May 6, 2022.

(51) Int. Cl.
| | |
|---|---|
| *H04R 29/00* | (2006.01) |
| *G06N 3/08* | (2023.01) |
| *H04R 3/00* | (2006.01) |
| *G10K 11/16* | (2006.01) |

(52) U.S. Cl.
CPC ............... *H04R 3/00* (2013.01); *G06N 3/08* (2013.01); *H04R 2420/07* (2013.01)

(58) Field of Classification Search
CPC .......... H04R 3/00; H04R 2420/07; G06N 3/08
USPC ..................................... 381/56, 71.1
See application file for complete search history.

(56) References Cited

U.S. PATENT DOCUMENTS

| | | | |
|---|---|---|---|
| 2009/0291643 A1 | 11/2009 | Tsao | 455/67.13 |
| 2014/0278420 A1 | 9/2014 | Meloney et al. | 704/249 |

FOREIGN PATENT DOCUMENTS

| | | | |
|---|---|---|---|
| CN | 114882906 A | * | 8/2022 |
| CN | 115526205 A | | 12/2022 |

OTHER PUBLICATIONS

Takeda, Hiroshi et al. "Training Robust Deep Neural Networks on Noisy Labels Using Adaptive Sample Selection With Disagreement" IEEE, Oct. 13, 2021 (Oct. 13, 2021).
Shen, Yexin. "Urban Acoustic Classification Based on Transfer Learning. Feature of Deep Convolution Neural Network" CNKI, Jan. 31, 2020 (Jan. 31, 2020).

(Continued)

*Primary Examiner* — Ammar T Hamid
(74) *Attorney, Agent, or Firm* — Stein IP, LLC

(57) ABSTRACT

A method for analyzing environmental sounds to identify repeating noises due to power equipment for purposes of controlling noise pollution is disclosed. Ambient sounds are sampled with microphones and the resulting data analyzed by an edge computing device. The samples are compared to stored data with a convolutional neural network by the edge computing device which also performs pitch shifting and cycle shifting to reduce false negatives. Positive results are reported via LoRa and/or 4G to a cloud platform and/or backend server.

20 Claims, 6 Drawing Sheets

(56) References Cited

OTHER PUBLICATIONS

Notification of Transmittal of the International Search Report and the Written Opinion of the International Searching Authority, of the Declaration dated Aug. 23, 2023, issued by the China National Intellectual Property Administration in corresponding application Cn PCT/CN2023/103336.

* cited by examiner

METHOD AND SYSTEM FOR REPETITIVE NOISE IDENTIFICATION

CROSS-REFERENCE TO RELATED APPLICATIONS

This application claims the benefit of U.S. Provisional Patent Application No. 63/338,901, titled DUAL NETWORK WIRELESS CUDA ENABLED EDGE COMPUTING FOR URBAN NOISE POLLUTION MONITORING, filed May 6, 2022, in the United States Patent and Trademark Office. All disclosures of the document named above are incorporated herein by reference.

BACKGROUND OF THE INVENTION

1. Field of the Invention

The present invention relates to a noise identification method, and a system implementing the method, for recognizing of repeated noises such as construction noise. The method comprises constructing a CNN+Shift+Pitch noise recognition engine which can classify similar noises like piling and mounted breakers.

2. Description of the Related Art

Noise control is important elements in government's current environmental protection policy. Real-time noise monitoring mean is necessary for rapid response to issue. Such systems are typically passive until a complaint is filed with an environmental regulator, and then the regulator will assess the situation. This consumes heavy human effort, and it is desired to have a noise recognition engine which can monitor and classify similar noises locally on site.

Real-time noise monitoring is known in the art, such as simply placing microphones in desired locations and then either reviewing recordings or monitoring the ambient sound in real time. However, certain kinds of construction equipment are heavy contributors to noise pollution and monitoring for their presence, especially if the use of such equipment requires a permit or other regulatory permissions, would be useful. Due to the complexity of the urban sound environment, identifying such equipment from ambient sound is difficult at best. A system for identifying such equipment would be useful.

In some environments, different types of equipment which sound similar can be subject to different regulatory requirements. Being able to distinguish such equipment automatically would be useful.

SUMMARY OF THE INVENTION

A convolutional neural network (CNN) is trained on multiple samples of repetitive noise sources to be monitored for by the system. Such samples are trained not only as recorded, but also as cyclically time-shifted samples to make it more likely that a repetitive noise will be correctly identified even if the ambient sound monitoring detects the noise in a time window not analogous to the original sample recording. Further, ambient noises are sampled for the pitch of the loudest repetitive sound detected in the ambient sound monitoring. The time interval between such sounds is correlated with the pitch range to further enhance the probability of successfully identifying a noise as a target noise generated by (regulated) equipment.

Once trained, the CNN is applied to independent (edge) computing devices, or "monitoring devices," which are deployed in areas to be monitored. The monitoring devices can use low-bandwidth network protocols such as LoRa to send low-priority information to a collector device, which then communicates through a cloud-based platform with a backend server containing a database and user interface protocols such as a web-based front-end system for users. If necessary, or for pushing software updates, the monitoring devices can also use 4G or other higher-bandwidth network protocols to communicate with the backend server either directly or through the cloud-based platform.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
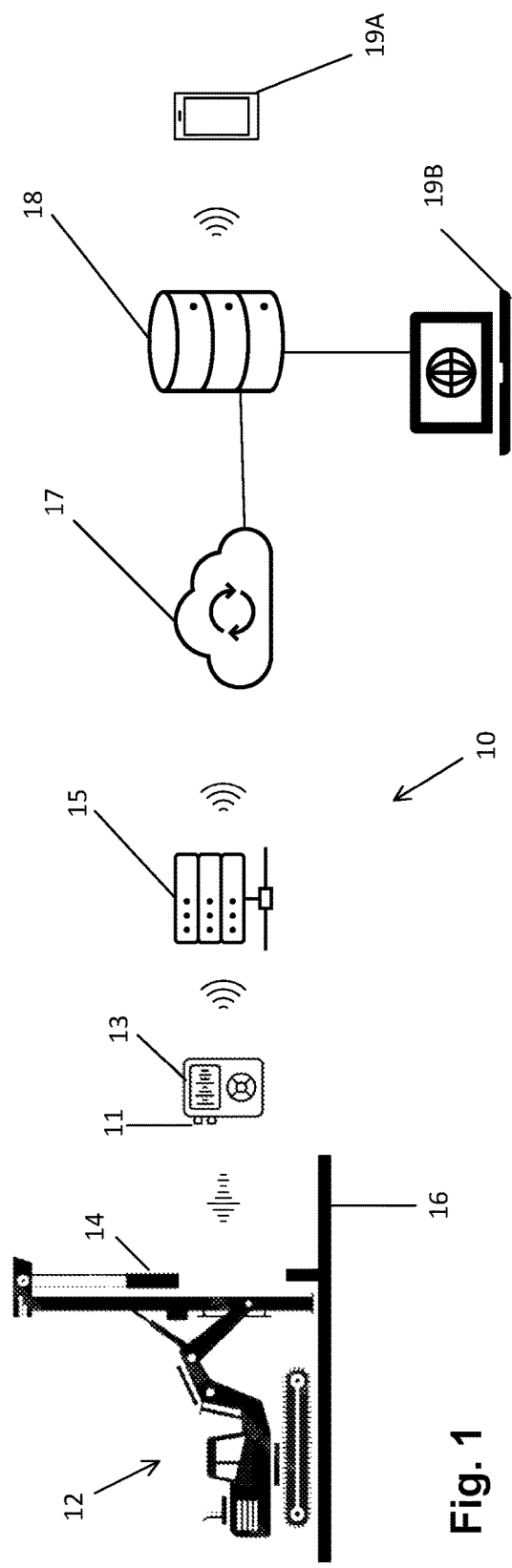
FIG. 1 is an abstracted schematic of a first embodiment of the invention monitoring a first noise source.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, can be used with respect to the drawings. These and similar directional terms are not to be construed to limit the scope of the invention in any manner. The words attach, connect, couple, and similar terms with their inflectional morphemes do not necessarily denote direct or intermediate connections, but can also include connections through mediate elements or devices.

The invention is described in terms of a system for monitoring urban environments for noise pollution, but could be used for any other suitable noise identification, e.g. to monitor a wilderness environment for animal or bird calls or the sound of prohibited vehicles or equipment.

Figure 2:
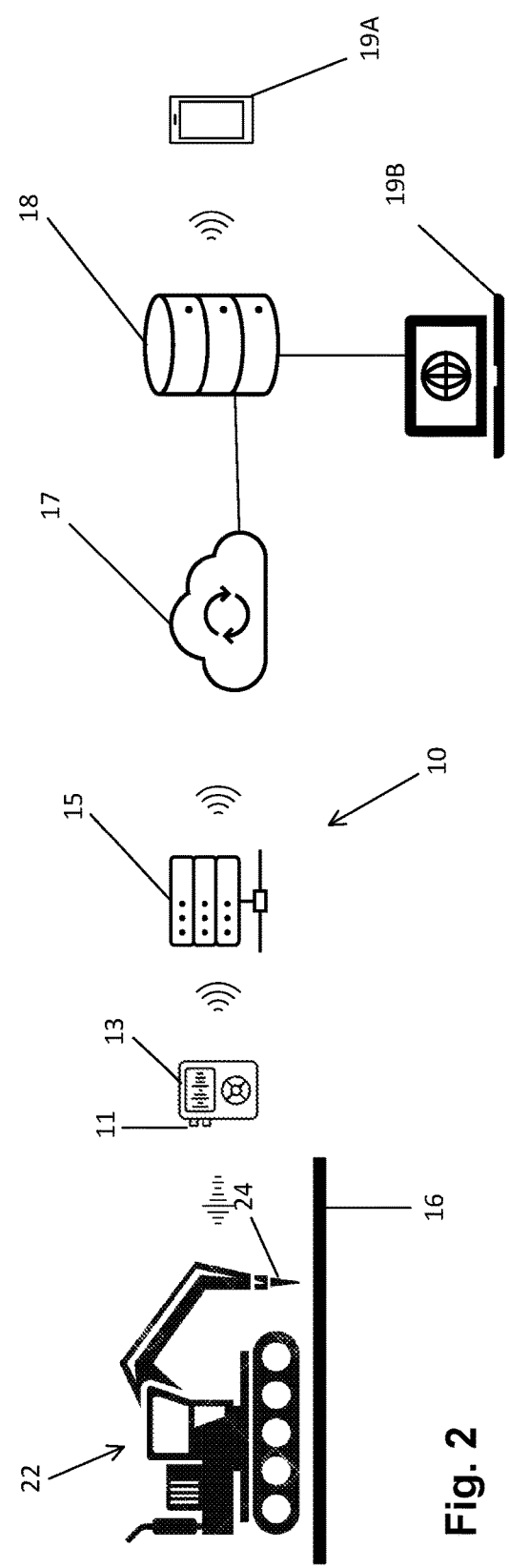
FIG. 2 is an abstracted schematic of a first embodiment of the invention monitoring a second noise source.

By referring to FIGS. 1 and 2, the basic configuration of the invention can be easily understood. FIGS. 1 and 2 both show noise recognition system 10, which comprises monitoring device 13, concentrator 15, cloud-based system 17, backend server 18, and access devices 19A and 19B. Monitoring device 13 is connected to microphone 11. Microphone 11 could be integrated into monitoring device 13, connected by wire, or connected wirelessly. When appropriate (see below,) monitoring device 13 transmits a data signal to concentrator 15, which in turn transmits the data signal to cloud-based system 17, which provides the data signal to backend server 18. Backend server 18 then makes the data to access devices such as smartphone 19A or PC 19B. The data is stored in backend server 18 for later review. Backend server may automatically push notices to the access devices to alert human users of particular data signals and/or allow human users to review all data at desired times.

In FIG. 1, monitoring device 13 detects a first noise source, by pile driver 12 which is driving a piling into surface 16 with impact hammer 14. Pile driver 12 will produce a characteristic repeating sound. Monitoring device 13 will analyze the sound and based on the results of such analysis, and send a data signal to concentrator 15 for transmission to the rest of the system. For purposes of this description, it assumes that operation of a pile driver is a regulated operation such that a work permit is required. Other regulatory controls could include decibel limits, hours of operation limits, remediation requirements, et cetera.

In FIG. 2, monitoring device 13 detects a second noise source, by compact tractor 22 which is breaking up surface 16 with mounted breaker 24. Mounted breaker 24 will produce a characteristic repeating sound which is similar to the sound of pile driver 12. Monitoring device 13 will analyze the sound and based on the results of such analysis, and send a data signal to concentrator 15 for transmission to the rest of the system. For purposes of this description, it assumes that operation of a mounted breaker is an unregulated operation.

It is preferred, but not required, that the monitoring device and the concentrator have the ability to communicate with both a low-bandwidth protocol such as LoRa for transmitting data signals upstream to the concentrator and the cloud-based platform respectively, and a high-bandwidth protocol such as 4G to receive updates to the CNN and other software from the backend server.

The monitoring device can comprise what is commonly referred to as an "edge" computing device, as the monitoring device performs some, but not all, of the computational tasks required by the system as a whole and requires a storage unit, a memory, and a processing unit to perform these tasks.

Figure 3A:
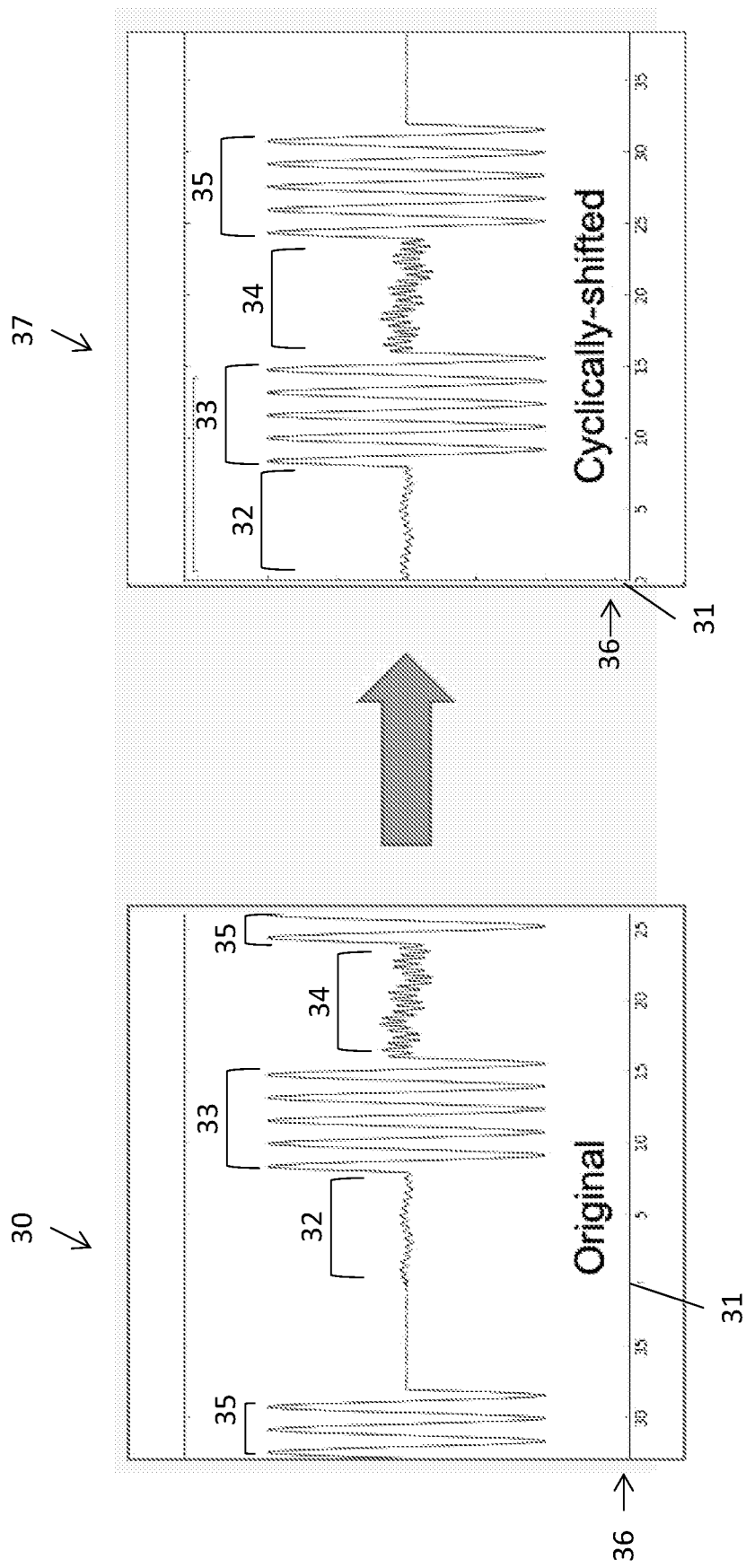
FIG. 3A is a graph of a sample sound waveform before and after cyclical shifting.

FIG. 3A shows a graph of a target noise waveform, i.e. a sound generated by a regulated piece of construction equipment such as pile driver 12 (see FIG. 1.) The waveform as recorded in original recording graph 30 includes initial sound 32 beginning at initial time 31, first impact sound 33, interval sound 34, and second impact sound 35. As seen, the actual recorded sound waveform begins at recording start time (or "time zero") 36, so the actual single second impact sound 35 is "split" across the beginning and the end of the graph. In cyclically-shifted graph 37, the waveform is the same, but the recording has been shifted by 15 seconds such that initial time 31 and time zero 36 are at the same point on the graph. This cyclically-shifted sample can now be used to train the CNN on how the target noise waveform would appear if sampled at a corresponding time.

FIG. 3A shows a process for storing shifted samples. In step 301, a target sound is sampled with a total duration of $T_L$. For purposes of this description, $T_L$ will be equal to 40 seconds.

In step 302, the sample is shifted by $T_n$, where n is a selected unit of time less than $T_L$. For purposes of this description, n will be equal to 5. It is preferred, but not required, for n to be an integral factor of L.

In step 303, the shifted sample is saved to be use for training the CNN.

In step 304, the method evaluates whether the number of shifts times n is equal to or greater than L, which would indicate that all possible cyclical shifted samples have been stored. If so, the method ends at step 305. If not, the current sample is again shifted by $T_n$, and the method repeats.

Figure 4A:
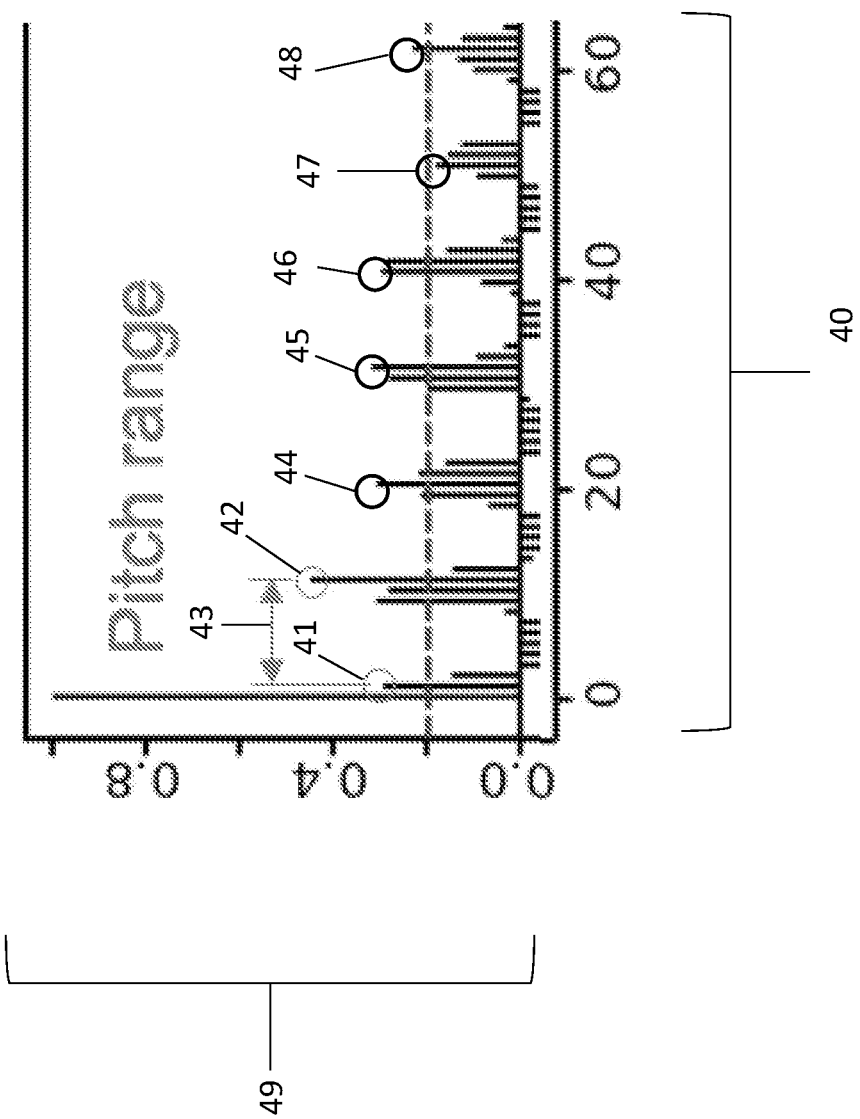
FIG. 4A is a graph of an ambient sound waveform with pitch range analysis points.

FIG. 4A shows a graph of the waveform of ambient sound monitoring over a $T_M$ labeled as 40, here equal to 60 seconds. The waveform is autocorrelated over a signal to determine the pitch range, which is defined as the inverse of the time lag between the first two positive peaks (here first peak 41 and second peak 42, separated by first time lag 43). Autocorrelation at each time step m is sum over n of:

$$x[n]*x[n+m]$$

As will be apparent, the higher the frequency of the signal, the lower the time lag will be. Compared to a standard waveform such as shown in FIG. 3A, the pitch range is independent of absolute volume and robust against noise as only the pitch of the (relatively) loudest sound is captured. Repetitive collision noises, such as those generated by a pile driver or a mounted breaker, tend to have a signature frequency, which makes this feature particularly suited to identifying noise generated by such devices.

Figure 4B:
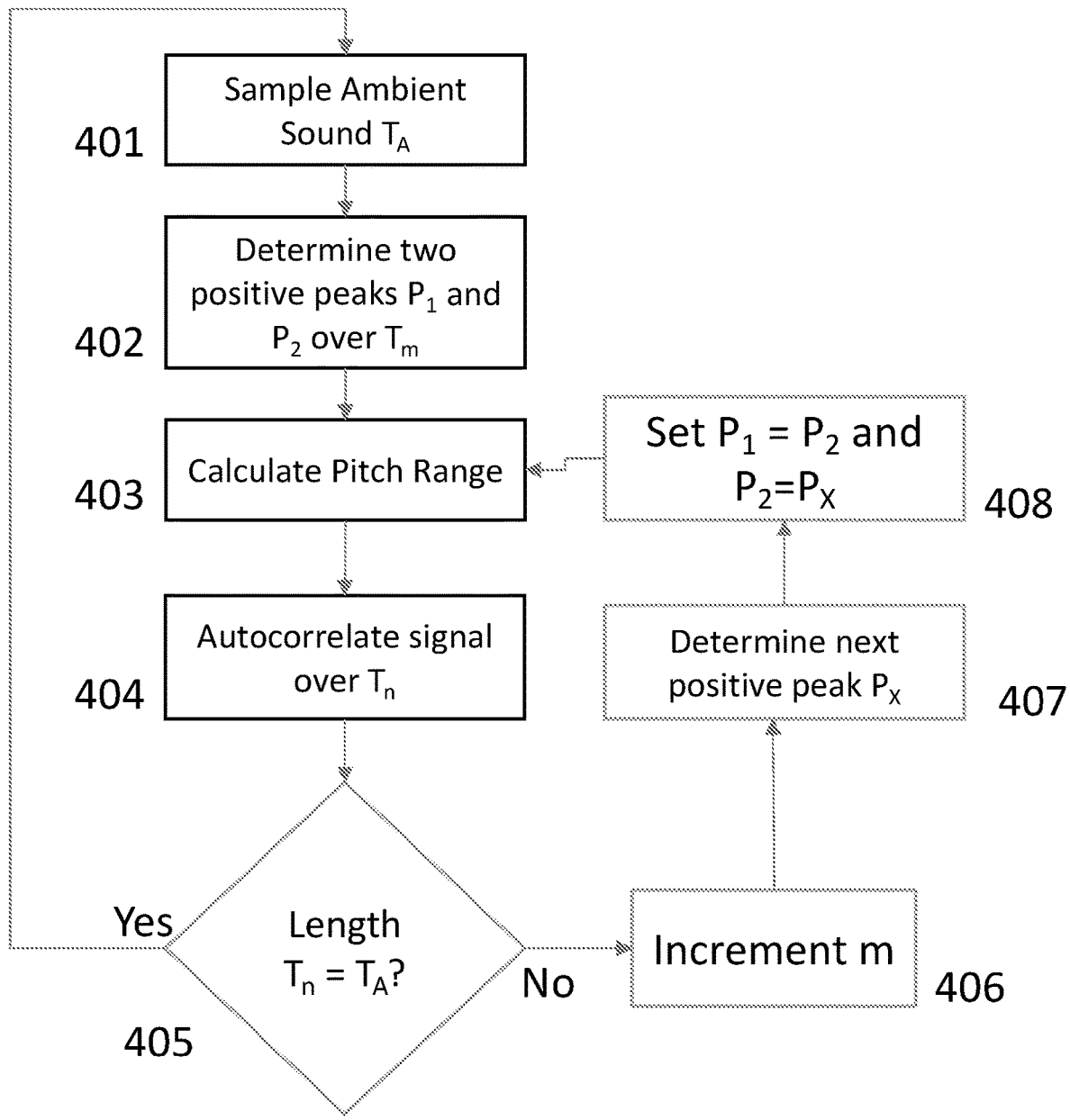
FIG. 4B is a flow chart describing the pitch range analysis process.

FIG. 4B shows a process for calculating the pitch range.

In step 401, the ambient sound is sampled over time length $T_A$.

In step 402, the first two positive peaks of sound $P_1$ and $P_2$ are determined over time interval $T_m$, where $T_m$ is some time less than $T_A$. It is preferred, but not required, that m be some integral factor of A.

In step 403, the pitch range is calculated as the inverse of the time lag between $P_1$ and $P_2$.

In step 404, the signal is autocorrelated with the model in the CNN over $T_n$, to determine if any target noises have substantially similar pitch ranges.

In step 405, the system determines whether $T_n$ is equal to $T_A$. (If m is not an integral factor of A, the system would determine whether $T_n$ is equal to or greater than $T_A$.) If not, the process proceeds to step 406. Otherwise, the process returns to step 401 and the process begins again.

In step 406, m is incremented.

In step 407, the next positive peak $P_x$ over the new $T_m$ is determined.

In step 408, $P_1$ is set to the value of $P_2$, and $P_2$ is set to the value of $P_x$.

In step 409, the pitch range is recalculated with the new $P_1$ and $P_2$, and the process continues to step 404.

Figure 5:
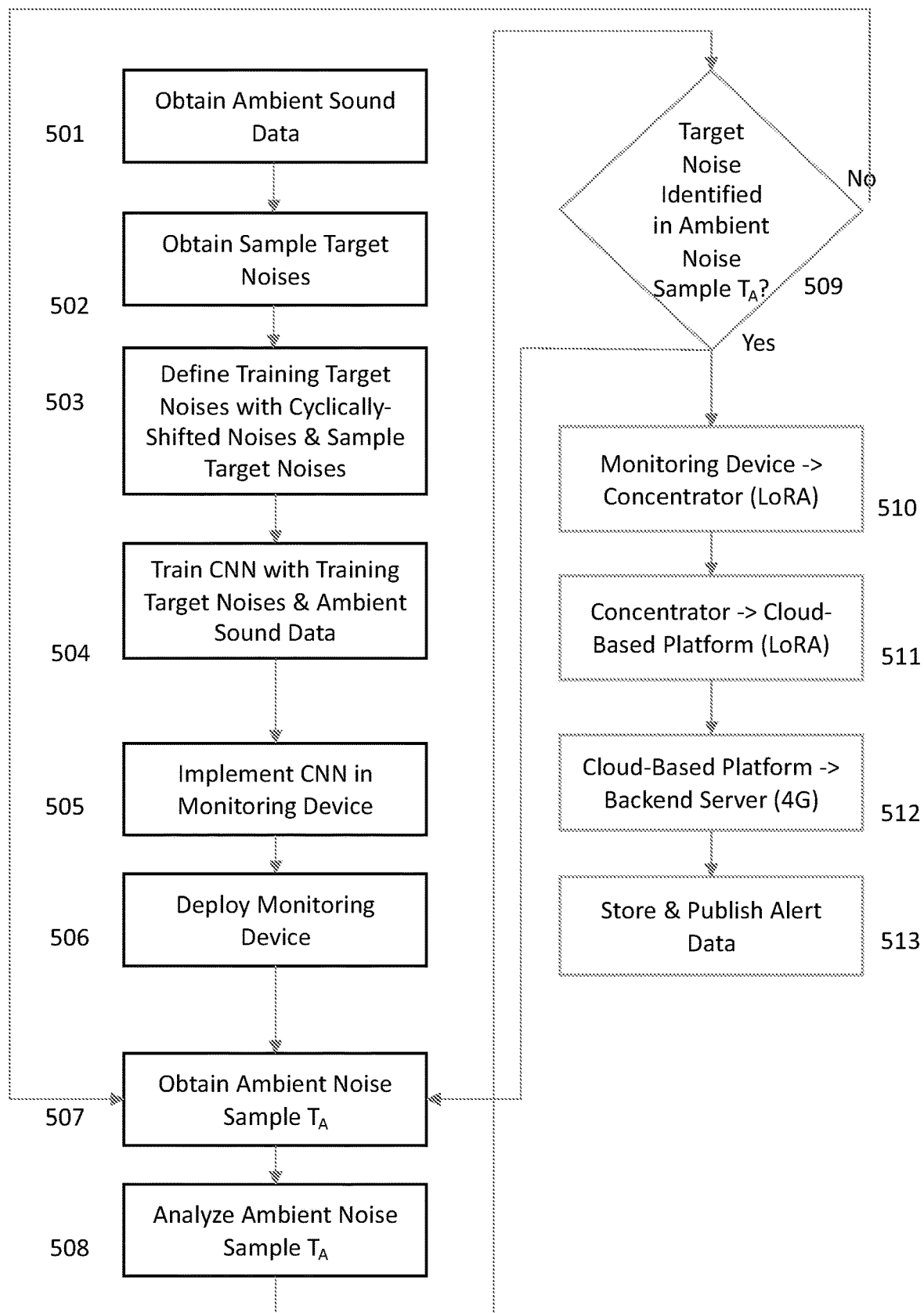
FIG. 5 is a flow chart describing the method of the invention.

FIG. 5 depicts the method of the invention.

In step 501, a large set of ambient noise data recorded in the environment where noise detection is to be performed is obtained. This can be recorded purposefully or obtained from a suitable source, such as the environmental regulator which will be responsible for the noise monitoring system.

In step 502, a set of sample target noises is obtained. These can be recorded purposefully or obtained from a suitable source, such as a manufacturer, dealer, stock sound provider, or the environmental regulator which will be responsible for the noise monitoring system.

Figure 3B:
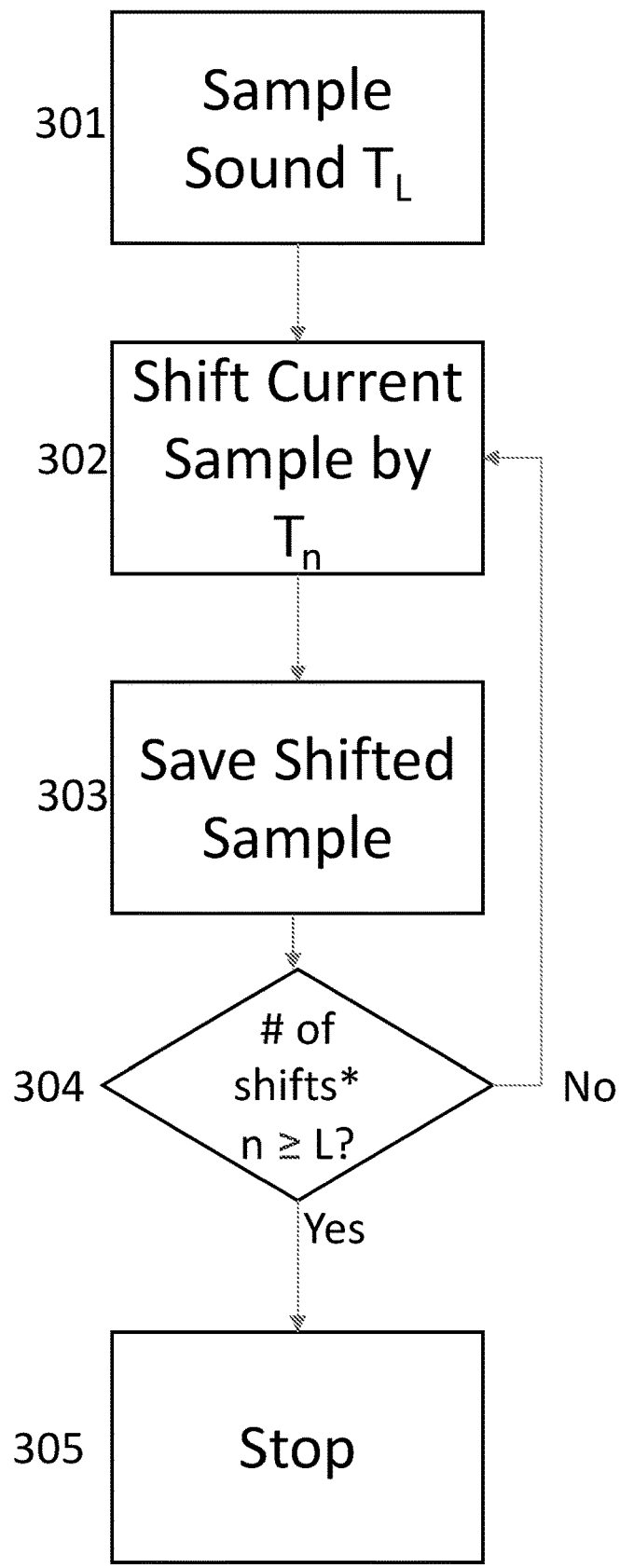
FIG. 3B is a flow chart describing the cyclical shifting process.

In step 503, the sample target noises are cyclically shifted as described in FIG. 3B to define a set of training target noises, which includes the set of sample target noises plus the set of cyclically shifted target noises.

In step 504, a convoluted neural network is trained to identify target noises using the data obtained in steps 501, 502, and 503.

In step 505, the convoluted neural network is implemented into a monitoring device.

In step 506, the monitoring device is deployed in a target location where target noises are to be identified.

In step 507, the monitoring device obtains an ambient noise sample of length $T_A$.

In step 508, the monitoring device analyzes the current ambient noise sample looking for target noises that it has been trained to recognize in step 504. It is preferred, but not required, that this analysis include both ordinary pattern matching and pitch range analysis as described in FIG. 4B.

In step 509, if the monitoring device identifies a target noise in the ambient noise sample, the method proceeds to step 510. Otherwise, the method returns to step 507 and the process repeats.

In step 510, the monitoring device sends a data signal containing alert data to a concentrator. It is preferred, but not required, that the data signal be sent over a low-bandwidth network such as LoRa.

In step 511, the concentrator forwards the data signal to a cloud-based platform. It is preferred, but not required, that the data signal be sent over a low-bandwidth network such as LoRa.

In step 512, the cloud-based platform sends the data signal to a backend server.

In step 513, the backend server stores the alert data and publishes the alert data in the data signal available to users via access devices.

This application, taken as a whole with the abstract, specification, and drawings being combined, provides sufficient information for a person having ordinary skill in the art to practice the invention as disclosed herein. Any measures necessary to practice this invention are well within the skill of a person having ordinary skill in this art after that person has made a careful study of this disclosure.

Because of this disclosure and solely because of this disclosure, modification of this device and method can become clear to a person having ordinary skill in this particular art. Such modifications are clearly covered by this disclosure.

Although a few embodiments of the present invention have been shown and described, it would be appreciated by those skilled in the art that changes may be made in this embodiment without departing from the principles and spirit of the invention, the scope of which is defined in the claims and their equivalents. Thus, the breadth and scope of the present invention should not be limited by any of the above exemplary embodiments.

What is claimed is:

1. A repetitive noise identification method comprising the steps of:
   obtaining a set of ambient sound data;
   obtaining a set of sample target noises containing at least one sample target noise;
   creating a set of cyclically-shifted target noises by cyclically shifting each of the sample target noises by one or more time-shift intervals;
   creating a set of training target noises comprising the set of sample target noises and the set of cyclically-shifted target noises;
   training a convoluted neural network to identify one or more target noises using the set of training target noises and the set of ambient sound data;
   implementing the convoluted neural network in a monitoring device, the monitoring device having a microphone, a processing unit, a storage unit storing the convoluted neural network, and a wireless communications unit;
   deploying the monitoring unit in an area to be monitored for the target sounds;
   obtaining an ambient noise sample having an interval time length $T_A$ with the microphone;
   analyzing the ambient noise sample with the processing unit to determine whether the ambient noise sample includes any of the target noises and if so, sending a data signal containing alert data to a concentrator, otherwise returning to the previous step;
   sending the data signal to a cloud-based platform from the monitoring device;
   sending the data signal from the cloud-based platform to a backend server;
   storing the alert data in a database; and
   publishing the alert data to one or more users through one or more access devices.

2. The method of claim 1, wherein the step of analyzing the ambient noise sample further comprises the steps of:
   identifying a first positive peak $P_1$ and a second positive peak $P_2$ within a sub-interval of the ambient noise sample over a period $T_n$, where $T_n$ is less than $T_A$;
   determining a time lag between $P_1$ and $P_2$;
   calculating a pitch range where the pitch range is the inverse of the time lag between $P_1$ and $P_2$;
   using the pitch range as a parameter in determining whether the ambient noise sample includes any of the target noises.

3. The method of claim 1, wherein the set of ambient sound data is obtained by recording the set of ambient sound data in the same geographical area where the monitoring device is to be deployed.

4. The method of claim 2, wherein the set of ambient sound data is obtained by recording the set of ambient sound data in the same geographical area where the monitoring device is to be deployed.

5. The method of claim 1, wherein the wireless communications unit includes a high-bandwidth wireless connection device and a low-bandwidth connection device, and the data signal is sent via the low-bandwidth connection device.

6. The method of claim 2, wherein the wireless communications unit includes a high-bandwidth wireless connection device and a low-bandwidth connection device, and the data signal is sent via the low-bandwidth connection device.

7. The method of claim 3, wherein the wireless communications unit includes a high-bandwidth wireless connection device and a low-bandwidth connection device, and the data signal is sent via the low-bandwidth connection device.

8. The method of claim 4, wherein the wireless communications unit includes a high-bandwidth wireless connection device and a low-bandwidth connection device, and the data signal is sent via the low-bandwidth connection device.

9. A system for repetitive noise identification, the system comprising:
   a monitoring device having a microphone, a processor, a storage, a memory, and a wireless communications unit, the monitoring device being able to send a data signal containing alert data;
   a convoluted neural network trained to recognize a set of target noises, the set of target noises including original target noise samples and cyclically-shifted target noise samples, the convoluted neural network stored in the storage and used by the processor to analyze an ambient sound sample recorded by the microphone to determine whether to send the data signal;

a concentrator unit to receive the data signal from the monitoring device, the concentrator unit having a concentrator memory and a concentrator wireless communications unit;

a cloud-based storage and processing unit to receive the data signal from the concentrator unit, the cloud-based storage and processing unit having a cloud-based memory unit, a cloud-based storage unit, and a cloud-based wireless communications unit;

a backend server to receive the data signal from the cloud-based storage and processing unit;

a database to store the alert data received by the backend server; and one or more access devices to publish the alert data to one or more users.

10. The system of claim 9, wherein the processor analyzes the ambient sound sample by calculating a pitch range of the ambient sound sample comprising the inverse of a time lag between a first positive peak and a second positive peak in the ambient sound sample and using the pitch range as part of the analysis of the ambient sound sample.

11. The system of claim 9, wherein a set of ambient sound data is obtained by recording the set of ambient sound data in the same geographical area where the monitoring device is to be deployed and the set of ambient sound data is used to train the convoluted neural network.

12. The system of claim 10, wherein a set of ambient sound data is obtained by recording the set of ambient sound data in the same geographical area where the monitoring device is to be deployed and the set of ambient sound data is used to train the convoluted neural network.

13. The system of claim 9, wherein the wireless communications unit includes a high-bandwidth wireless connection device and a low-bandwidth connection device, and the data signal is sent via the low-bandwidth connection device.

14. The system of claim 10, wherein the wireless communications unit includes a high-bandwidth wireless connection device and a low-bandwidth connection device, and the data signal is sent via the low-bandwidth connection device.

15. The system of claim 11, wherein the wireless communications unit includes a high-bandwidth wireless connection device and a low-bandwidth connection device, and the data signal is sent via the low-bandwidth connection device.

16. The system of claim 12, wherein the wireless communications unit includes a high-bandwidth wireless connection device and a low-bandwidth connection device, and the data signal is sent via the low-bandwidth connection device.

17. The system of claim 13, wherein the low-bandwidth connection device is a LoRa device, and the high-bandwidth connection device is a 4G or 4G compatible connection device.

18. The system of claim 14, wherein the low-bandwidth connection device is a LoRa device, and the high-bandwidth connection device is a 4G or 4G compatible connection device.

19. The system of claim 15, wherein the low-bandwidth connection device is a LoRa device, and the high-bandwidth connection device is a 4G or 4G compatible connection device.

20. The system of claim 16, wherein the low-bandwidth connection device is a LoRa device, and the high-bandwidth connection device is a 4G or 4G compatible connection device.

* * * * *